United States Patent [19]

Gallion et al.

[11] Patent Number: 4,640,450
[45] Date of Patent: Feb. 3, 1987

[54] ROOF RACK FOR MOTOR VEHICLES

[75] Inventors: Georg A. Gallion, Wiesbaden; Dieter N. Bratke, Wallerstadten; Klaus Helbig, Russelsheim; Karl F. Reuter, Kelsterbach, all of Fed. Rep. of Germany

[73] Assignee: General Motors Corporation, Detroit, Mich.

[21] Appl. No.: 735,891

[22] Filed: May 17, 1985

[30] Foreign Application Priority Data

May 19, 1984 [DE] Fed. Rep. of Germany ....... 3418770

[51] Int. Cl.$^4$ .............................................. B60R 9/00
[52] U.S. Cl. .................................... 224/331; 224/315; 224/328
[58] Field of Search ............... 224/324, 325, 322, 321, 224/320, 315, 314, 326, 327, 328, 329, 330, 331

[56] References Cited

FOREIGN PATENT DOCUMENTS

| 2939671 | of 0000 | Fed. Rep. of Germany . |
| 2945950 | 5/1981 | Fed. Rep. of Germany ...... 224/315 |
| 2950449 | 6/1981 | Fed. Rep. of Germany ...... 224/315 |
| 3151404 | of 0000 | Fed. Rep. of Germany . |
| 3201409 | 9/1983 | Fed. Rep. of Germany ...... 224/315 |
| 7703771 | of 0000 | Fed. Rep. of Germany . |
| 2509676 | 1/1983 | France ............................... 224/328 |

Primary Examiner—Stephen Marcus
Assistant Examiner—David Voorhees
Attorney, Agent, or Firm—Charles E. Leahy

[57] ABSTRACT

In a roof-mounted luggage carrier which is to be attached to a flange of a channel disposed on the lateral portion of a vehicle roof, the support leg and the clamps are covered, as is known in the art, by a protective cap to prevent dirt and water from entering into the channel, with the lower edge of said cap being disposed in close proximity of the surface of the roof and being provided with a sealing which is adapted to bear upon the roof panel and/or the molding.

2 Claims, 5 Drawing Figures

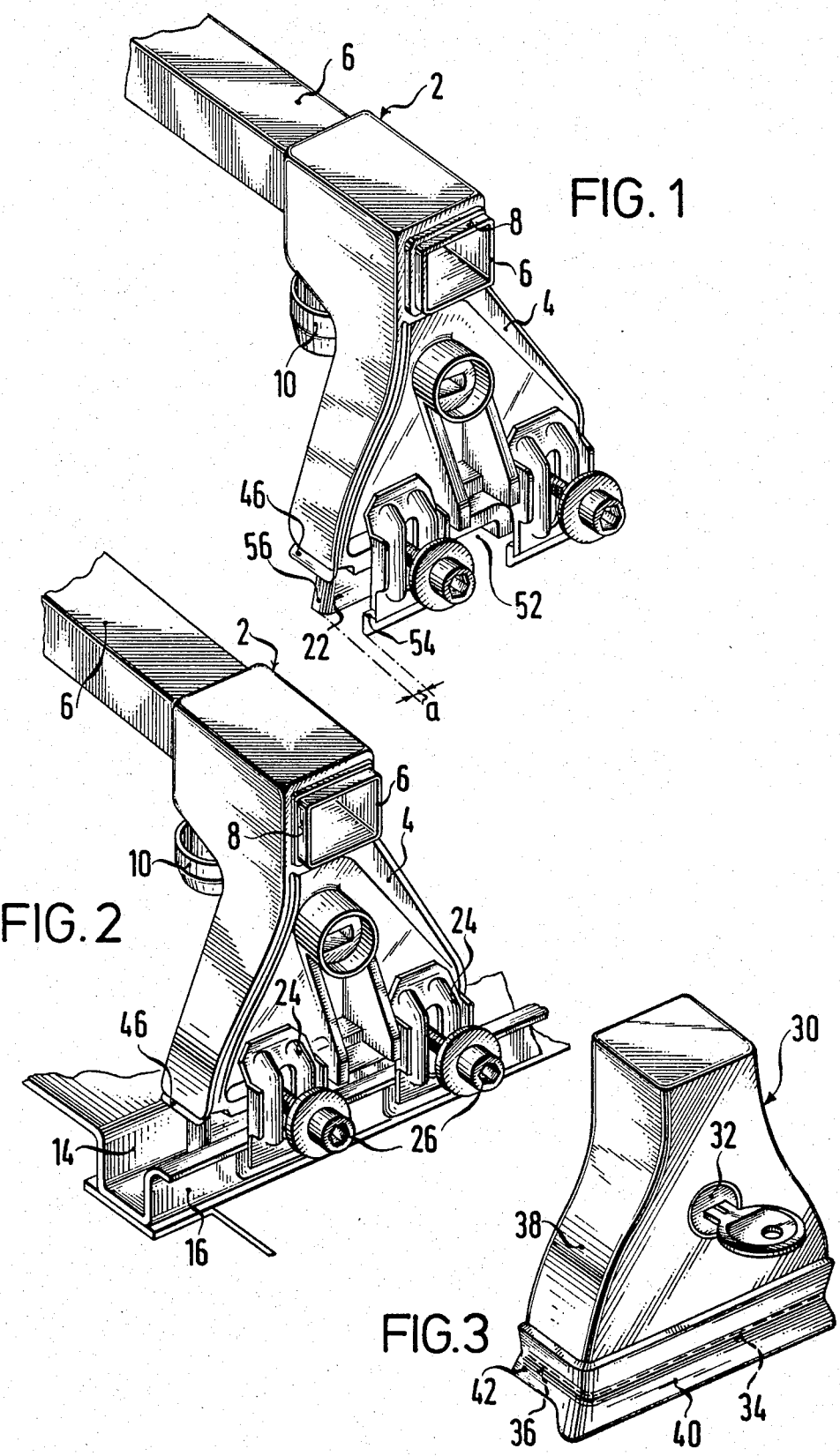

ROOF RACK FOR MOTOR VEHICLES

The invention is directed to a roof-mounted luggage rack for motor vehicles including a device adapted for attachment to a flange formed in a longitudinally extending channel disposed on the lateral portion of the roof, said channel being covered by a molding strip which is provided, at the location where the luggage rack is mounted to the roof, with a cutout for receiving the leg and the clamps of the luggage rack.

BACKGROUND OF THE INVENTION

The cutout for the luggage rack in the molding strip is usually covered when the luggage rack is not being used, and is only uncovered when the luggage rack is to be mounted onto the roof. The covering of the cutout in the molding strip prevents water, dirt, or the like from entering into the channel when the luggage rack is not in use. During the time when the luggage carrier is mounted on the roof, i.e., when the cover must be removed from the cutout, water or dirt is usually able to collect in the channel, because the support leg and the clamping member of the luggage rack are not able to cover the channel, i.e., the cutout in the molding, in a manner that would ensure proper sealing of the same.

Therefore, it is the object of the invention to provide a roof-mounted luggage carrier which is provided with features that will prevent, during the time the luggage rack is mounted on the vehicle roof, dirt, water, snow, or the like from entering into the channel. This objective is to be accomplished with relatively simple means and without the need for additional parts.

SUMMARY OF THE INVENTION

The foregoing results are being achieved in the luggage rack of the present invention in that the leg and the clamping member are covered towards the outside, as is usual, by a cap whose lower edge is disposed in close proximity of the roof surface, and which is provided with a sealing lip for engagement with the roof panel and/or the molding strip.

Preferably, the sealing lip on the lower edge of the cap extending longitudinally of the vehicle is in direct contact with the roof panel. In order to provide sealing for the area of the molding strip also in the transverse direction of the vehicle, the cap is provided, in an advantageous manner, with lateral walls that extend transversely of the vehicle longitudinal direction, and the sealing lip disposed on the lower edge of these walls is arranged so as to extend across the molding strip. This arrangement provides that the opening in the molding strip is sealed on three sides. Nevertheless, the molding strip cutout on the vehicle inboard side must also be sealed. This is accomplished in accordance with another feature of the invention in that on the luggage carrier support leg there is arranged a sealing lip which adjoins the sealing lip of the cap. This arrangement will provide that, with the luggage rack being mounted on the vehicle roof, the cutout is sealed on all four sides, so that water, snow or other unwanted substances cannot enter into the channel. A relatively simple way of arranging the sealing lip on the leg of the luggage rack is one in which the sealing lip and the jacket of the rack support leg are in the form of a one-piece construction.

The upper portion of the support leg has an opening for receiving, in a manner known in the art, a cross rail on which are disposed the various retaining devices for the articles to be attached to the roof. Since this opening extends all the way through the upper portion of the leg, i.e., since the upper portion of the support leg is open on both sides, it is preferable that the cap extend upwardly past the opening provided in the upper portion of the leg, which will provide that this opening is also covered by the cap. This arrangement will also ensure that in the event the clamping arrangement of the cross rail should become loose, the cross rail cannot be laterally displaced very much, because such lateral displacement of the cross rail, which may occur when the vehicle is negotiating turns, could be very hazardous.

The leg of the roof-mounted luggage rack is supported on the bottom of the channel, which may be a weld channel. In order to provide a positive and solid support for the leg in the channel, the leg, which is relatively wide, has a recess which is disposed approximately in the middle of the leg and which extends upwardly from the lower edge. This arrangement provides the leg with a two-point support so as to prevent it from tilting.

Clamping of the luggage carrier to the flange is accomplished, preferably, by the employment of one clamp on each side of the recess. The arrangement of employing a pair of clamps for each leg of the luggage carrier provides better control of the braking forces, i.e., at a given larger distance the clamping force will become more effective.

The clamps and the support leg, i.e., the mounting means, are arranged in such a manner that no direct shear forces caused by the luggage carrier will act on the flange. For this purpose, the clamp is arranged such that, when projected onto the support leg of the luggage carrier, its outer edge is spaced at a distance "a" from the outer edge of the support leg. Furthermore, the edges of the leg and that of the clamp may have radii, i.e., they may be rounded off.

BRIEF DESCRIPTION OF THE DRAWINGS

One exemplary embodiment will be described by reference to the drawing, wherein

FIG. 1 is a perspective view of the support leg of the luggage carrier with the clamps, FIG. 2 is a view of the support leg after being attached to the flange, FIG. 3 is a view of the cap for covering the support leg and the clamps.

DESCRIPTION OF THE PREFERRED EMBODIMENT

Figure 4:
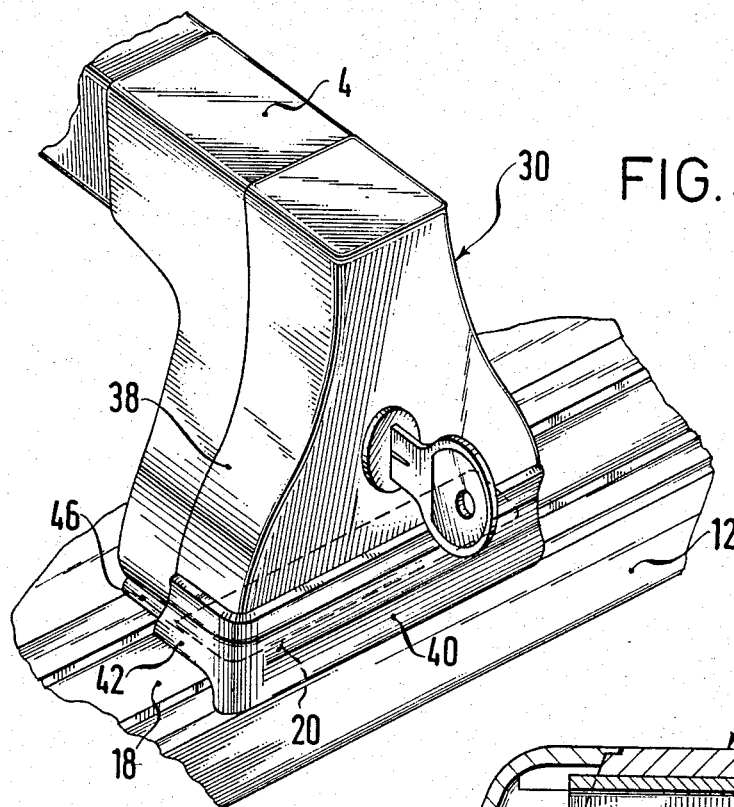
FIG. 4 is a view of the luggage carrier and the cap in the mounted position.
Figure 5:
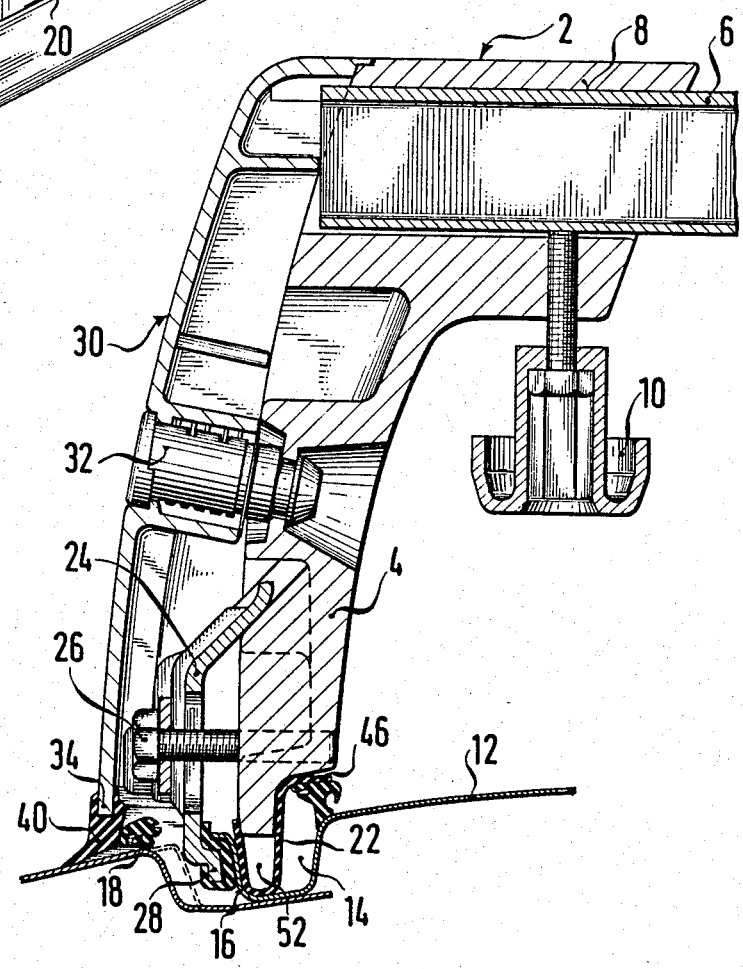
FIG. 5 is a cross-sectional view of the support leg.

FIG. 1 illustrates the luggage carrier 2 which is comprised of the support leg 4 and a cross rail 6 retained in an opening 8 in the support leg 4 and secured in position to prevent displacement by means of a locking screw 10. The cross-sectional configuration of the support leg 4 is illustrated in FIG. 5. The support leg 4 rests with its lower end portion on the bottom of the channel 14 formed into the lateral portions of the roof 12. The channel 14, which may be a weld-type channel, has a flange 16 formed thereon to which is mounted the luggage carrier 2. The channel 14 is covered by molding 18 (FIG. 4) which is provided with a cutout 20 for accommodating the support leg 4. The cutout 20 in the molding 18 may be covered in any desired fashion during the time the luggage carrier is not mounted on top of the vehicle.

The support leg 4 has a jacket 22, made of rubber or the like, attached to its lower end. The clamp 24, i.e., two clamps 24 in accordance with the invention, are disposed on the support leg 4, as illustrated in FIGS. 1 and 2. The clamps 24 are urged, by tightening the threaded bolts 26, against the support leg in such a manner that their lower end 28, which is also provided with a jacket, is being fastened, together with the leg 4, to the flange 16.

A protective cap 30, adapted for attachment to the support leg 4 by means of a locking device 32, is used for covering said leg 4 and the clamps 24. In the mounted position, the lower edge 34 of the cap 30, which extends longitudinal of the vehicle and which has transversely extending portions 36 formed by the lateral walls 38, is disposed in close proximity of the surface of the roof 12. The lower edges 34 and 36 are provided, respectively, with sealing lips 40 and 42 made of a suitable material. The lip 40 is bearing against the roof panel 12 or against the molding 18 if the same is of sufficient width. The transversely extending sealing lips 42 are arranged transversely over the molding 18, and the width of the sealing lip 42 corresponds to about the width of the cutout 20, as illustrated in FIG. 4.

The remaining portion of the cutout 20 directed towards the midsection of the roof is sealed by a sealing lip 46 which is attached to the support leg 4. The sealing lip 46 is integrally formed with the jacket 22 and is bearing against the molding 18. On the sides of the support leg 4 the sealing lip 46 extends transversely for a short distance and overlaps with the sealing lip 42, so that the cutout 20 is sealed throughout.

The protective cap 30 extends upwardly far enough to cover the opening 8 of the transverse rail 6.

The support leg 4, which is relatively wide in the longitudinal direction of the vehicle, has a recess formed in its midportion. By virtue of this arrangement, the leg 4 is supported by two-point contact on the bottom of the channel. A pair of clamps 24, one on each side of the recess, are attached to the leg 4. The outer edges 54 of the clamps 24 (FIG. 1) are offset by the dimension "a" with respect to the edges 56, i.e., the clamping surfaces are offset relative to one another, so that direct shearing on the flange 16 is prevented. A further means to accomplish this purpose is to provide the leg 4 with edges 56 that are slightly rounded off, as indicated in FIG. 1. By virtue of the relatively large width of the lower portion of the leg 4, the load is distributed over a larger surface area.

The embodiments of the invention in which an exclusive property or privilege is claimed are defined as follows:

1. A roof-mounted luggage carrier for motor vehicles including a leg and clamp device adapted for attachment to a flange which is formed in a longitudinal extending channel disposed on the lateral portion of the roof, said channel being covered by a molding strip for preventing entry or dirt into the channel and being provided with a cutout for the installation of the leg and the clamp of the luggage rack, said cutout being disposed only at the place where the luggage rack is mounted to the roof, the improvement characterized in that:

a protective cap attached to the leg and having a lower edge disposed in close proximity with the roof surface, and a seal means connected to and extending downwardly from the lower edge of the protective cap and including a longitudinal extending lip which bears against the roof and transversely extending lateral lips at the front and rear of the leg extending transversely of the vehicle and sealingly engaging with the molding strip on each side of the cutout thereof, to thereby prevent entry of foreign matter into the channel through the cutout in the molding strip.

2. A roof-mounted luggage carrier for motor vehicles including a leg and clamp device adapted for attachment to a flange which is formed in a longitudinal extending channel disposed on the lateral portion of the roof, said channel being covered by a molding strip for preventing entry or dirt into the channel and being provided with a cutout for the installation of the leg and the clamp of the luggage rack, said cutout being disposed only at the place where the luggage rack is mounted to the roof, the improvement characterized in that:

a protective cap attached to the leg and having a lower edge disposed in close proximity with the roof surface, and a seal means connected to and extending downwardly from the lower edge of the protective cap and including a longitudinal extending lip bearing against the roof and transversely extending lateral lips at the front and rear of the leg extending transversely of the vehicle and sealingly engaging with the molding strip on each side of the cutout thereof; and additional sealing lip means attached to the support leg and extending transversely of the vehicle inboard of the leg and the protective cap and sealingly engaging with the molding strip to thereby cooperate with the lips of the protective cap to entirely sealingly surround the cutout in the molding strip to thereby prevent entry of foreign matter through the cutout into the channel.

* * * * *